United States Patent [19]

Lemelson

[11] 3,708,253
[45] Jan. 2, 1973

[54] EXTRUSION APPARATUS

[76] Inventor: Jerome H. Lemelson, 85 Rector Street, Metuchen, N.J. 08840

[22] Filed: Sept. 1, 1970

[21] Appl. No.: 68,724

Related U.S. Application Data

[60] Continuation-in-part of Ser. No. 736,081, June 11, 1968, Pat. No. 3,526,020, which is a division of Ser. No. 142,405, Oct. 2, 1961, Pat. No. 3,422,648.

[52] U.S. Cl. ................425/155, 425/325, 425/326, 425/393
[51] Int. Cl. .............................................B29j 5/06
[58] Field of Search.........18/14 R, 14 A, 14 C, 14 G, 18/14 S, 14 V, 19 TM, 19 TC, 19 TE; 425/155, 325, 326, 393

[56] References Cited

UNITED STATES PATENTS

| | | | |
|---|---|---|---|
| 3,538,548 | 10/1970 | Tenner | 18/14 V |
| 3,484,900 | 12/1969 | Sands et al. | 18/19 TM |
| 3,068,517 | 12/1962 | Blackmore | 18/14 S |
| 3,283,050 | 11/1966 | Boggs | 18/14 A X |
| 3,205,535 | 9/1965 | Niessner et al. | 18/14 V |
| 3,085,293 | 4/1963 | Kritchever | 18/14 V X |
| 3,425,093 | 2/1969 | Ansette | 18/19 TE |
| 3,432,887 | 3/1969 | Poux et al. | 18/19 TE |

Primary Examiner—H. A. Kilby, Jr.

[57] ABSTRACT

An apparatus and method are provided for forming tubular extrusions which vary in shape along their length. In one form, an extrusion is belled outwardly along selected portions of its length to provide, when severed along the belled portions, means for joining sections of the extrusion together as in a piping system, without the need for separately formed fittings. The variation in diameter of the extrusion may be effected in a number of manners employing tooling associated either with the mandrel over which the tubing is formed to shape or mounted against or adjacent to the external face of the extrusion die. Modified forms of the apparatus may also be provided to machine or outwardly deform portions of preformed tubing.

10 Claims, 11 Drawing Figures

PATENTED JAN 2 1973
3,708,253
SHEET 1 OF 2
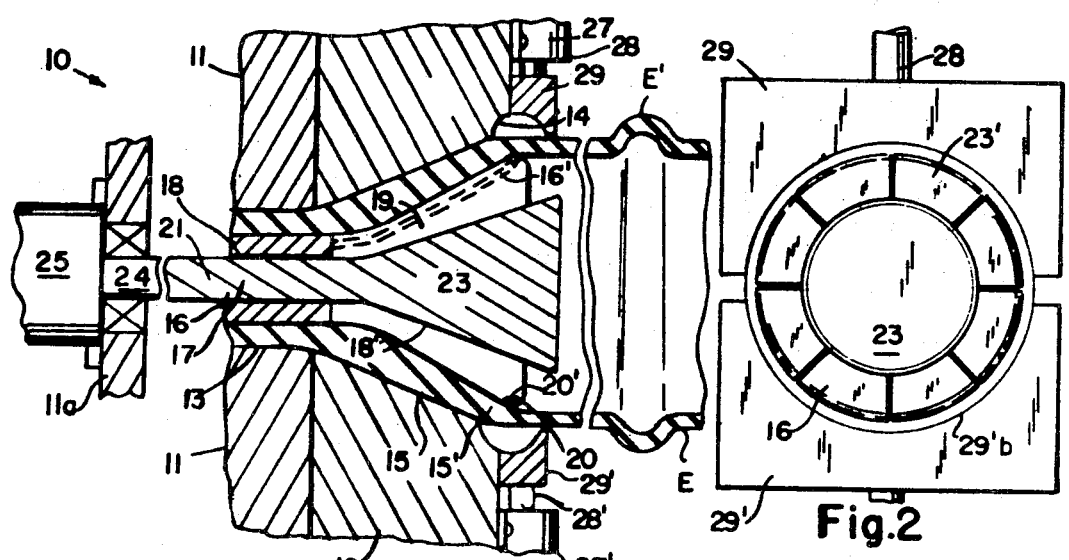
Fig. 1
Fig. 2
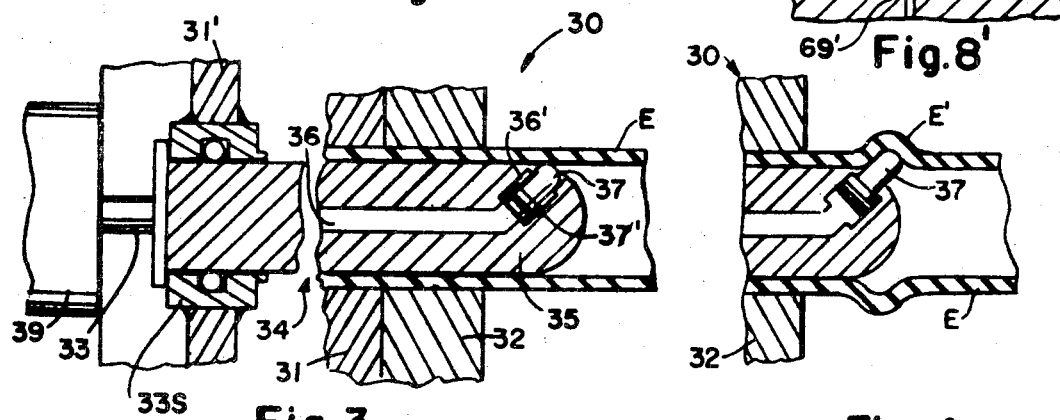
Fig. 3
Fig. 4
Fig. 8
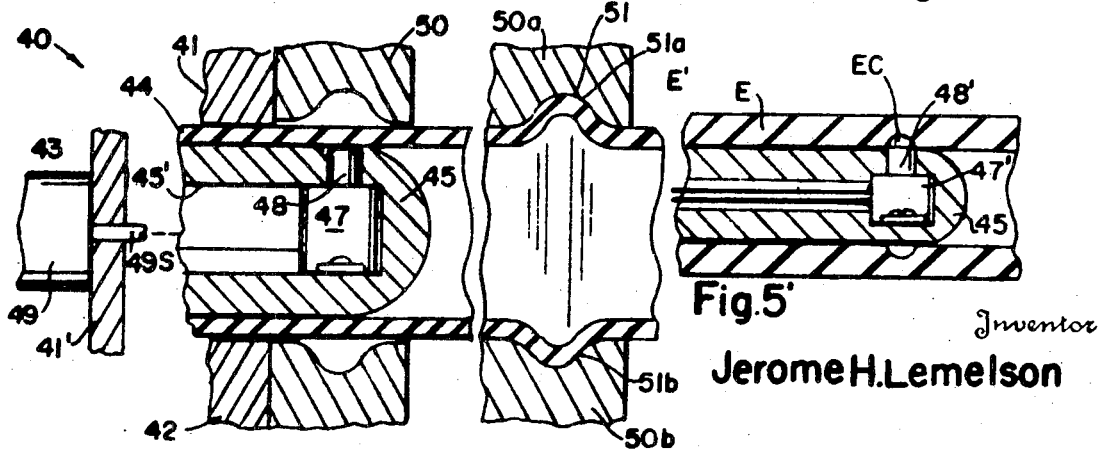
Fig. 5
Fig. 6
Fig. 5'
Inventor
Jerome H. Lemelson INVENTOR.
Jerome H. Lemelson

EXTRUSION APPARATUS

RELATED APPLICATIONS

This is a continuation-in-part of application Ser. No. 736,081 filed June 11, 1968, now U. S. Pat. No. 3,526,020 which was a division of application Ser. No. 142,405 filed Oct. 2, 1961, now U. S. Pat. No. 3,422,648.

SUMMARY OF THE INVENTION

This invention relates to an apparatus and method for operating on extrusions as or immediately after they are formed to shape to change the shape thereof and to eliminate the need for one or more post-forming operations in order to render the extrusions applicable to specific uses. Although not necessarily limited thereto, the invention relates to an apparatus for flaring, grooving or threading predetermined portions of a tubular extrusion preferably as or immediately after it is formed to shape and before it is cut to length.

It is known in the art to form pipe and tubing by extruding a suitable metal or plastic material through a die containing a mandrel which is operative to define the inside wall of the tubing while the wall of the extrusion orifice defines the constant diameter outside wall of the tube. In applying such tubing for the conduction of liquids and gases, it is generally cut to predetermined lengths which are thereafter, upon shipment to the site or location where they are to be utilized, welded or fastened together with tube fittings. The assembly operation requires the welding or bonding of specially made fittings to aligned ends of two or more tubes or one or more of a plurality of operations on the tube ends including such post forming operations as chamfering, flaring, threading or upsetting the material at the ends of the cut lengths of tube. As a result, a substantial amount of labor is required to rehandle, preposition and operate on the cut lengths of tubing before they are conditioned to permit proper assembly into a fluid conducting system. Accordingly, it is a primary object of this invention to provide a new and improved apparatus and method for automatically and continuously operating on an extrusion such as a tube or pipe extrusion, as or immediately after it is formed so as to change its shape along predetermined portions thereof for facilitating assembly of sections of the tube when it is desired to form a piping system thereof.

Another object is to provide an apparatus for predeterminately varying the inside diameter of a tubular extrusion as or immediately after it is formed to shape so as to eliminate the need for effecting such a change in shape at some time thereafter.

Another object is to provide an apparatus for forming a tubular extrusion of rigid material containing portions of the length thereof having resilient material deposited on the rigid material or forming a portion of the wall of the extrusion for serving one or more purposes.

Another object is to provide an apparatus for extruding tubular shapes over a mandrel and for operating said mandrel to effect the predetermined cut-off or severance of lengths of said tubular shape without the need for applying external tooling.

Another object is to provide an extrusion apparatus for forming tubing of variable cross section and predeterminately severing sections of the extrusion whereby the variable sections of the tubing are predeterminately located along each severed section.

Another object is to provide an apparatus for varying the inside shape of an extruded tube or pipe as it is extruded to improve the flow characteristics of material passing through the tube and for varying the change in shape thereof along different sections of the tube.

Another object is to provide an improved apparatus and method for extruding tubes and other shapes which vary in cross section along their length, said apparatus being operative also to cut off lengths of the extrusion in a manner such that said variations in cross section are provided at predetermined locations along the length of each cut off section.

Another object is to provide an apparatus and method for deforming thin walled tubing by the use of cooperating dies and a mandrel and the application of fluid pressure to effect the deformation of the wall of the tubing into a cavity defined by the dies.

Another object is to provide a programmable apparatus for variably applying coating or sealant material to selected portions of a pipe or tube as it is fed.

With the above and other such objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

FIG. 1 is a partial side view with parts broken away for clarity of an extrusion apparatus for forming a tubular extrusion having portions of the wall thereof bulging outwardly to define receptacles for sections of the tube and sealing members when the tubing is properly cut to the length;

FIG. 2 is an end view of the apparatus of FIG. 1;

FIG. 3 is a side view with parts broken away for clarity of a modified form of the invention which defines a projectable deforming means;

FIG. 4 is a side view of the apparatus of FIG. 3 illustrating an extrusion deformed thereby;

FIG. 5 is a side view with parts broken away for clarity of a modified form of the apparatus of FIG. 4;

Figure 7:
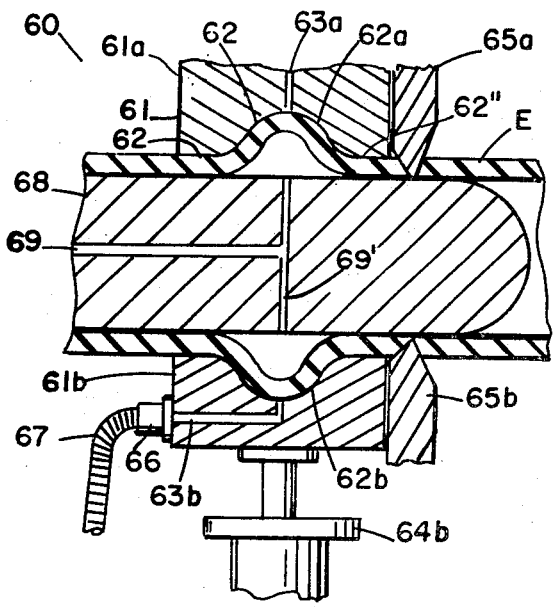
Figure 8:
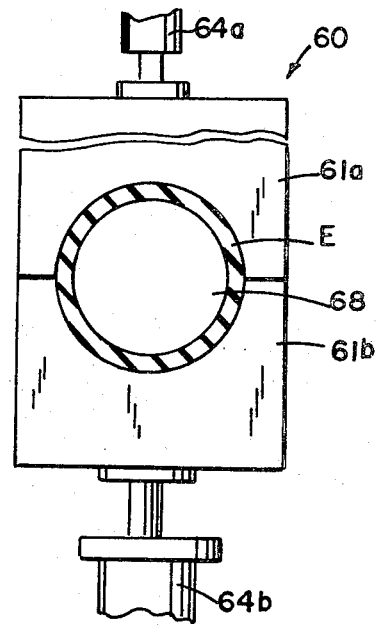
Figure 9:
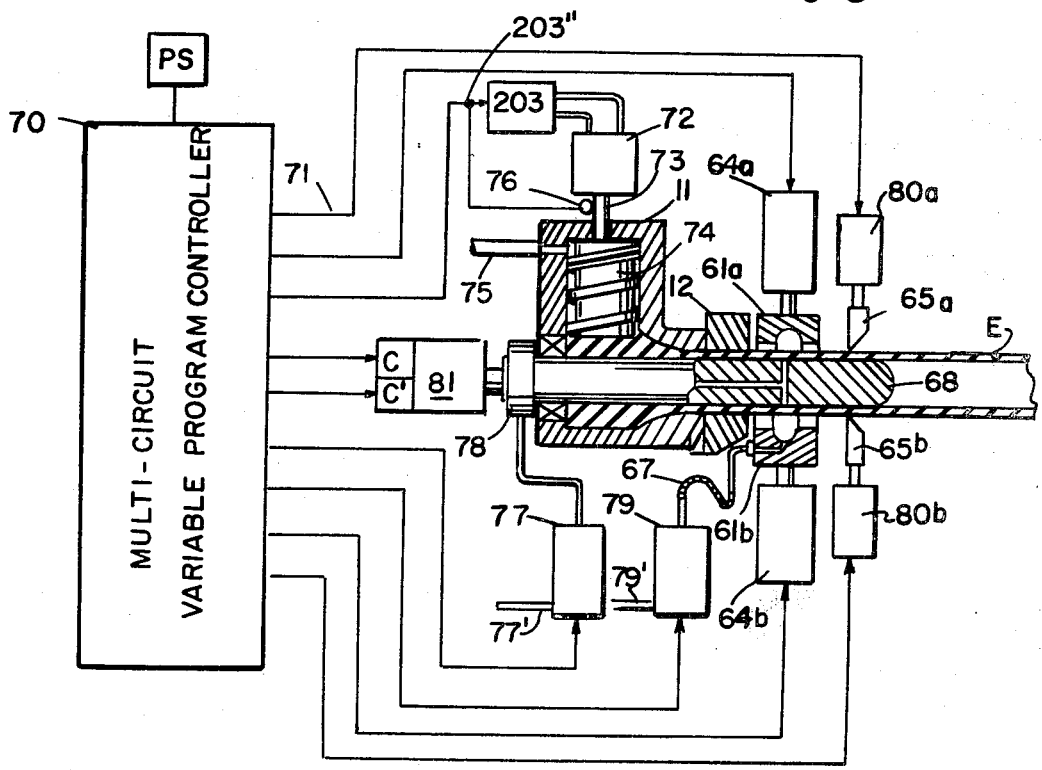

FIG. 5' is a side view with parts broken away for clarity of an extrusion mandrel operative to machine a portion of the inside wall of the extrusion;

FIG. 6 is a side view with parts broken away for clarity of a modified form of the apparatus of FIG. 5;

FIG. 7 is a side view with parts broken away for clarity of an apparatus for deforming an extrusion by pressure means;

FIG. 8 is an end view of the apparatus of FIG. 7;

FIG. 8' is a fragmentary view in cross section of a modified form of the apparatus of FIGS. 7 and 8;

FIG. 9 is a schematic diagram illustrating a control system applicable to apparatus of the type shown in FIGS. 1 to 8' and showing both open and closed loop control means for certain of the components as particularly applied to an extrusion apparatus for forming and severing thin walled tubing.

In general, the instant invention is defined by apparatus for continuously forming tubular extrusions having outwardly flared or beaded wall formations provided along predetermined portions of the length of the extrusion by operating on the extrusion immediately after it is formed to shape and is still in a relatively soft and easily deformable condition. Various tube deforming means are provided in which either the mandrel over which the extrusion is formed to shape outwardly expands and, in certain instances, rotates so as to predeterminately deform the freshly formed extrusion or in which fluid pressure is applied either directly through the mandrel to effect expansion of the tubing or through the die or auxilliary die means applied to the extrusion immediately after it has expressed from the extrusion die. While the different embodiments shown in the drawings illustrate modified forms of apparatus for effecting the deformation of a freshly formed tubular extrusion, it is noted that features of certain of the devices shown per se may be combined with the features of others of the illustrated forms to provide means for forming more complex shapes without departing from the spirit of the invention. Furthermore, while the apparatus is described as an automatic extrusion apparatus, modified forms thereof may be used to effect the described results on either previously formed tubing or tubing formed by means other than extrusion such as by continuous casting, roll forming or the like. While a freshly formed thin walled extrusion may be provided in a soft enough condition immediately after it is formed in the extrusion die, in certain instances, it may be necessary to reheat the extrusion by induction, radiation or other means prior to deforming same as described herein.

There is shown in FIGS. 1 and 2 an extrusion and forming apparatus 10 which is operative for producing an extrusion such as a tube or pipe defined by the notation E and having portions E' of its tubular wall which are outwardly bulged or beaded to serve one or more of a plurality of functions. The beaded formations E' may serve to retain a sealing ring or sealant material which may be used to seal and secure sections of said tubing to other sections thereof or to fittings which are inserted into the tube during the construction of a conduit or piping system formed of lengths of said extrusion E.

The apparatus 10 includes an extruder 11 having means (not shown) for expressing an extrusion material or extrudate through the opening 15 in a die 12 thereof and over the outer surface of a mandrel 16 which either forms part of the extrusion die and is supported thereby or is supported longitudinally in said opening by the wall 11' of the extrusion chamber itself. The mandrel 16 has an elongated, preferably cylindrically shaped base 17 extending to an outwardly tapering frusto-conical head 19 which extends through the opening 15 in the die 12 to substantially the end of said die opening. The end portion 20 of the mandrel head 19 is rounded and is peripherally disposed proximate to the end portion 14 of the die wall 13 so as to define an annular gap or passageway 15' between the two surfaces through which extrusion material flows and forms the shape of the tubular extrusion E.

In order to form outwardly bulging beaded portions E' of the extrusion E, the end portion of the head 19 of the mandrel is operative to outwardly expand against the freshly formed tubular extrusion so as to bulge same outwardly and, when the length of the bulged formation E' is a predetermined dimension, the mandrel thereafter contracts or moves radially inwardly to the condition illustrated in FIG. 1.

To permit the head 19 of the mandrel to outwardly deflect, said mandrel head may be hinged or radially segmented to a plurality of outwardly deflectable portions 23' or may be made of a material such as silicone rubber or other suitable material which may be deformed the desired degree without permanently deforming and will self-retract or contract upon removal of the forces which outwardly deform same. A bore 18 extends through the mandrel 17 in which is inserted a sub-mandrel 21 having a cylindrical shape 22 which is longitudinally movable within the bore 18 and a tapered, frusto-conical head portion 23 which sets within a tapered bore 18' extending through the head 19 of the mandrel 16. Thus, when the sub-mandrel is drawn along the bore 18 to cause the head 23 thereof to be drawn into the tapered bore 18', the head portion 23 is operative to outwardly expand the head 19 of the main mandrel so that the end portion 20 thereof moves radially outwardly to deform the freshly formed tubular extrusion E and to provide a beaded formation E' therein.

A hydraulic ram 25 is secured to the rear wall 11a of the extrusion chamber 11' and has a shaft 24 extending into and through the bore 18 in the mandrel 16, which shaft is coupled to the end of the sub-mandrel 21. Retraction of the shaft 24 by suitably controlled and timed operation of the ram 25 is operative to pull the sub-mandrel 21 further into the bore 18' of the mandrel 16 to cause the tapered end portion 23 thereof to outwardly expand the head 19 of the mandrel 16 and to outwardly deform the wall of the tubular extrusion E as shown at E'. A stepped or flared portion 14 of the inside wall 13 of die 12 may cooperate in shaping the wall of the extrusion as may a pair of blades 29 and 29' which are mounted at the ends of shafts 28 and 28' of lineal servos 27 and 27' defining therewith respective forming tool assemblies 26 and 26'. The servos are illustrated and supported at the end of the extrusion chamber 11 and are controlled in the operation to advance blades 29 and 29' which have circular surface formations 29'a and 29'b conforming to the shape of the deformed portion of the extrusion, against that portion of the extrusion which has been deformed by the end portion of the mandrel head 19 so as to effect the beaded shape defined by notation E'. In other words, the lineal actuators 27 and 27' are simultaneously operated in predetermined timed relationship to the operation of the ram 25 which is utilized to outwardly expand and contract the end portion of the head 19 of the mandrel 16.

The apparatus of FIG. 1 is also operative for automatically depositing a material along a predetermined portion of the inside surface of the extrusion E to effect a fluid seal between portions of the tubing which are cut off from the main extrusion. For example, an elastomeric resin, adhesive resin or other suitable material may be time dispensed from the passageways 16' in the tapered portion 20 of the mandrel head to fill, if not protrude outwardly from, the channel indentations defined by the beaded formations E' and such material may be used to effect a circumscribing seal against a tubular member such as another section of pipe which is inserted into the extrusion E.

Provision of a circular or cylindrical formation of elastomeric, adhesive, welding or other material against a predetermined portion of the wall of the extrusion is effected by predeterminately operating a pump or opening a valve admitting said material to one or more passageways 16' extending through the mandrel and terminating at a recess or channel 20' circumscribing the outer surface of the end portion 20 of the mandrel head 19 to properly dispense said material against the inside surface of the wall of the extrusion.

It is briefly noted that, while the extrusion material is preferably a plastic resin which may be easily deformed by the expanded mandrel, it may also comprise a suitable ceramic or metal. While the head 19 of the mandrel 16 is shown outwardly expanded by proper movement of the tapered end 23 of the mandrel, it may also be expanded by inflation utilizing a suitable fluid injected into the head at the proper instant during an extrusion cycle and removing therefrom to contract the mandrel, to permit extrusion of a normally unexpanded tubular member.

FIGS. 3 and 4 illustrate another means for outwardly bulging or expanding portions of the tubular extrusion as the extrusion is formed. An extrusion apparatus 30 includes an extruder 31 including means (not shown) for forcing an extrusion material through the chamber 34 thereof into the opening in an extruding die 32 and over a mandrel 35 extending through said opening. Outward deformation of the wall E of the extrusion is effected by a deforming tool 37 which is movable at the end of the mandrel 35 and is projectable radially outwardly against the wall of the extrusion to deform same. The deformation may be rendered circular or cylindrical by suitably rotating the mandrel when the tool 37 is outwardly projected. This may occur while the flow of extrusion material has been temporarily stopped or while it is in motion, depending on the exact shape desired of the deformed portion of the wall of the extrusion and the speed at which the mandrel rotates. The deforming tool 37 is a piston which is longitudinally movable through a radially or outwardly extending bore extension 36' of a passageway 36 extending longitudinally through the mandrel 35. Piston 37 contains an O-ring in a groove in its cylindrical surface for effecting a seal between the wall of the bore and the piston. An enlarged piston head 37' engages the end of the bore for the head to define the forward travel of the piston. Positive fluid pressure applied through a controlled valve to the bore 36 causes the piston to protrude from the mandrel and react against the wall of the extrusion E so as to outwardly deform same as shown in FIG. 4. While this would ordinarily dimple or provide a longitudinal groove in the extrusion, if the mandrel 37 is automatically rotated the protruding portion of the piston will react against the wall of the extrusion and form a circular bead-like formation E' therein or a helical thread or bead therein depending on whether the extrusion is in motion or stationery during such operation. The sudden application of negative pressure to the bore 36 is operative to cause the piston to retract into the mandrel so as not to engages the wall of the extrusion. Although not shown, the application of positive and negative pressures for actuating the piston may be effected by means of suitable fluid control valves controlled in their operation by suitable signals applied by an automatic controller as will be described hereafter. Shown in FIG. 3 is a gear motor 39 mounted against the rear wall 31 of the extrusion chamber and having its output shaft connected by a coupling 33 to the rear of the mandrel 35 or an extension thereof. The mandrel 35 is shown extending through a rotary seal 33S disposed in an opening in the rear wall of the extruder. Suitable rotary fluid coupling means (not shown) may be provided on shaft 33 or the mandrel itself for conducting said negative and positive fluid pressure to the passageway 36 in the extrusion die mandrel.

In FIG. 4 is shown mandrel tooling in the form of a pivotable portion fot the mandrel such as a finger 38 mounted on a pin 38P extending across the end of the mandrel and supported bearing by the mandrel. The pin 38 is pivotably movable against the inside wall of the extrusion in a slotted cavity 36" in the mandrel when a shaft 38' is pushed forward by a lineal actuator (not shown).

The rate-of-flow of extrusion material, the application of positive and negative pressures to the bore 36 and the rotation of the mandrel 35 are preferably all controlled by means of a program controller which may be preset or varied in its operation in accordance with the geometry of the extrusion and the required locations of internal threading and/or beaded formations or flaring of the extrusion along its length. It is noted that the deforming tool 37 may have a blunt shaped nose for radially outwardly deforming the wall of the extrusion or may be shaped with one or more cutting edges to actually machine the extrusion while it is stationary or in motion. In this connection, it is also noted that the tapered mandrel head 19 of FIG. 1 may also contain or be shaped with one or more cutting edges which are normally retained retracted to clear the inside surface of the extrusion and are projectable radially outwardly by means such as described to cause said cutting edges to engage and machine threads, circular or longitudinal slots in the wall of the extrusion depending on whether or not the mandrel is held stationary or it rotated during the cutting action.

FIGS. 5 and 6 illustrate another apparatus 40 for outwardly forming and machining predetermined portions of an extrusion such as a tube or pipe expressed from an extrusion chamber 41 through the opening in a die 42 connected to said chamber and over a mandrel 45 extending through said die opening as described. Disposed within the mandrel 45 is an electrical servo device 47 such as a solenoid or motor-driven mechanism which is operated to radially project a shaft 48 shaped as or connected to a deforming or cutting tool and extending through a radial hole in the mandrel so as to perform, as described, in upsetting, deforming or machining an extrusion E flowing over the mandrel. The solenoid 47 is connected by wires 47' which extend through a bore 45' in the mandrel. Connected to the mandrel 45 for rotating same is a shaft 49S of a motor 49 mounted against the rear face of the rear wall 41' of the extrusion chamber. The shaft 44 extends through a rotary seal in said extrusion chamber and the wire 47W extends from the bore 45' in the mandrel 45 through or along the shaft 49S to the exterior of the extrusion chamber where it is connected to a suitable switching means and control system which is controlled to operate the servo 47 in projecting and retracting a tool 48 during predetermined portions of an extrusion cycle while the motor 49 is operated to rotate the mandrel 45 to cause the tool 48 to outwardly flare or bead the extrusion or to form or machine a thread in the wall thereof.

In the operation of flaring or beading the extrusion E by means of rotating the protruding tool 48 thereagainst, a support for the extrusion wall may be provided in the form of external guide means 50 which comprises, as illustrated in FIG. 6, a plurality of dies 50a and 50b each being shaped with a respective contoured portion 51a and 51b which provide surfaces which conform to the desired external shape of the deformed portion of the extrusion. Said dies are respectively mounted adjacent to or against the front face of the extrusion tool and/or extrusion chamber and are operative to be simultaneously moved radially towards the extrusion by respective lineal actuators or motors 52a and 52b which are program controlled to project and retract said dies by a single cycle controller which also controls the operation of the lineal actuator 47 mounted in the mandrel 45, the rotation of the mandrel and, in certain instances, the flow of extrusion material. Notation 51 refers to the tapered longitudinal portion of the dies 50 which is shaped to substantially conform to the exterior surface of the deformed portion of the extrusion which is formed thereagainst by the flaring or deforming tool 48 during the deforming cycle as described.

A modified form of the apparatus of FIGS. 5 and 6 is shown in FIG. 5' wherein the motor or solenoid 47' is operative to project a cutting tool 48' connected to a shaft which tool machines a circular channel EC in the wall of the extrusion E or cuts a helical thread therein, the pitch of which is determined by the rotational velocity of the mandrel 45 and the rate-of-flow of the extrusion E.

It is noted that in each of the devices illustrated in FIGS. 3–6 a sealing material such as an elastomeric material, adhesive, solid film lubricant or other material may be injected through the deforming tool or a passageway in the mandrel adjacent thereto to fill or coat pre-selected portions of the extrusion such as the deformed portions thereof by suitable means as described which are disposed within and external of the mandrel.

FIGS. 7 and 8 illustrate another form of the invention wherein the deforming of predetermined or selected lengths of a tubular member such as an extrusion is effected by fluid pressure means applied to selected portions of the extrusion while it is in a formable condition. The apparatus 60 illustrates a tubular extrusion E which is disposed between a pair of aligned dies 61 which are respectively denoted 61a and 61b. The extrusion E is shown disposed over a mandrel 68 which may form part of an extrusion apparatus as described or any suitable apparatus which is operative to cooperate in deforming the extrusion. The dies 61a and 61b are respectively connected to respective lineal actuators 64a and 64b such as fluid cylinders, solenoids or motors which are operative to suitably advance the dies against the extrusion prior to the forming operation and to retract same therefrom after the forming operation.

IN FIGS. 7 and 8 the two dies are provided with respective cavities 62a and 62b which circumscribe the extrusion when the dies are advanced, said cavities forming an annular circumscribing depression 62 outwardly of the extrusion into which the wall of the extrusion may be deformed by fluid pressure applied either through the dies and/or through one or more passageways 69 in the mandrel 68. Passageways 63a and 63b are provided in the respective dies 61a and 61b and are each connected to source of vacuum or negative pressure by means of respective solenoid valves 66, one of which is shown mounted on the die 61b and is connected to a vacuum pump (not shown) by means of a flexible hose 67 which deflects with the radial movement of the die. In one form of operation, when the dies 61 are sealingly compressed together and advanced as shown, semi-circular surfaces 62' and 62'' on both sides of the forming cavities in the dies are forced into sealing engagement with separated portions of the extrusion E so that the die cavity 62 will be sealed against atmospheric pressure by the surface of the extrusion. Accordingly, when negative pressure is applied to said cavities, the extrusion will be drawn outwardly into the cavities 62 to deform against the surfaces of the cavity walls. Positive pressure may also be applied to the passageway 69 in the mandrel 68 and through a plurality of radial passageways 69' extending therefrom to the surface of the mandrel in alignment with the cavities of the dies. Said positive pressure may be used per se to outwardly deform the extrusion or in cooperation with the negative pressure applied through the dies. Also shown in FIG. 7 are a pair of cutting dies 65a and 65b which may be program controlled to cut through selected portions of the extrusion against the mandrel as shown so as to provide sections of said tubing having the deformed portions E' predeterminately located on each such section (viz: near the end).

In the event that the extrusion E is not soft enough to be thermally deformed, each of the dies 61a and 61b may be electrically heated to soften the extrusion. Other heating means may include electrically or otherwise heating the mandrel 68 or providing the fluid used to deform the extrusion at a suitable high temperature.

In the event that a hydraulic fluid is applied to the mandrel passageways 69 and 69' to outwardly bulge the extrusion to the die cavities, said fluid may be applied as a sudden pulse and thereafter retracted back into the mandrel to prevent overflow into the interior of the extrusion by suitably operating positive and negative fluid pressure servo or valve means connected to the fluid conducting system which includes the mandrel passageway. Said fluid system may include fluid lines connected to the rear of the mandrel which extends through an opening (not shown) in the extrusion chamber wall or may extend through passageways in the extrusion die itself and through spider connecting means (not shown) which anchor the mandrel in the extrusion die.

The described operations of mechanically deforming the tubular extrusion E may be effected while the tubing is in motion by rapidly operating the dies or deformation tools in a simple advance and retract stroke or by moving said deforming tools or dies along with the extrusion at substantially the velocity of the extrusion and retracting same thereafter prior to initiating the next deforming cycle. In a third mode of operation, suitable control means may be provided for stopping the travel of the tubular member or extrusion during the deforming operation and said control means as well as the other variables may be automatically controlled by a program controller as described.

In FIG. 8' is shown a modified form of the apparatus of FIGS. 7 and 8 showing the mandrel 68 thereof is provided with a circular recess or channel 68R circumferentially circumscribing the mandrel and communicating with one or more of the radial passageways 69' which is connected to positive and negative fluid pressure means through a suitable two way valve (not shown). A flexible ring or band 69R of suitable sheet material such as stainless steel or plastic capable of deflecting to either conform to the shape of the channel 68R or protrude outwardly therefrom as indicated by the broken lines, has its lateral edges welded or otherwise bonded to circular portions of the mandrel to form a covering of the ring 69R for the channel 68R. Thus when positive pressure is applied to passageway 69' the band 69R will bowe or expand outwardly as shown to outwardly compress against the extrusion and force the wall of the extruded tobe to deform per se with a bead-like formation as shown at E' in FIG. 8 or may cooperate with the dies 29 in effecting such formation. Application of negative pressure to passageway 69' is operative to cause the ring-band 69R to be drawn back into the channel 68R to permit the tubular extrusion to pass over the mandrel.

In the operation of the extrusion apparatus shown in FIGS. 1 to 8', depending on the wall thickness and physical characteristics of the extrusion being deformed, the tooling described may operate by radial and/or spinning deformation of the wall of the extrusion to permanently deform and provide said circular bulging or beading of the extrusion. Accordingly, the extrusion may be in a semi-molten or soft state as extruded or as reheated or may be substantially completely set if not reduced in temperature well below the softening point. If the extrusion material, when so deformed, is in a soft condition such that it will not ordinarily retain the shape imparted thereto by the tooling without support until its sets, the external tooling or dies may be maintained in contact with the extrusion while stationery or while in motion for a sufficient interval of time for the extrudate to set or solidify sufficiently to prevent the deformed portion thereof to change shape. Such setting may be hastened by circulating a heat transfer fluid through the deforming means during the deforming process and/or by ejecting a refrigerating or cooled gas or liquid from a nozzle exterior of the extrusion and/or from the end of the mandrel, preferably in timed relationship to the deforming operation and under control of the same master control means controlling operation of the extruder and the deforming apparatus.

In a modified form of the apparatus of FIGS. 7, 8 and 8' the gas or liquid applied under positive pressure to the passageways 69' may be applied at sufficient temperature to soften the portion of the extrusion in the area where said gas is applied so as to facilitate deforming said extrusion as described. A complete deforming cycle may also include first supplying heated fluid to passageways 69' to soften the wall of the tubing aligned therewith and, after deformation has been effected, then supplying fluid at a substantially lower temperature, preferably a refrigerant, so as to rapidly set the heat softened material. The application of both said heated and cooled fluids to said passageway may be effected by a two or three way valve connected to said passageway 69 which valve is controlled in its operation by suitable cycle control means preferably also controlling extrusion and the deforming tooling. If the extrusion material is a metal such as aluminum, it may be suitable softened for deformation of same as described by suitable gas heating means, means for supplying a liquid at or above the softening temperature of the metal or by induction heating the die and or mandrel. If the tubular member E is made of steel or other high melting point material, it may be selectively heated by induction means which is timed to heat and soften just those portions of the member which are to be deformed. Suitable gas burning, plasma, laser or electron beam means supported by the mandrel and/or externally of the extrusion may also be time controlled in its operation by a single master controller to heat and soften the selected portions of the tube prior to deforming same.

In FIG. 9 is shown details of an automatic control system for variably controlling a tube extrusion and deforming apparatus of the type hereinbefore described. A multi-circuit program controller 70 such as a multi-circuit timer or a command signal generator may be used to operate all of the servos or valve-operating solenoids in the proper sequence so as to control not only the extrusion process but also the auxiliary apparatus necessary to effect varia tions in the shape of the wall of the extrusion. While in its simplest form, the controller 70 may comprise an electro-mechanical or electronic timer operative to provide electrical power for the various servos which operate the extrusion apparatus and the described wall-deforming apparatus in an open loop system, a preferable system is one in which the extrusion variables and, in certain instances, the tube-deforming means are predeterminately controlled by respective closed loop control sub-systems of the type described in application Ser. No. 142,405. Such a sub-system is illustrated in FIG. 9 as applicable for controlling the motor 72 whichrotates the extrusion screw 74 to feed material from an inlet 75 connected to a supply of said material to the main extrusion chamber and outwardly through the extrusion die 12 over the mandrel 68. The control means for the extrusion material feed motor 72 includes a sub-system 203 which, as described in said parent application, includes an electric stroker which is operated by an error signal generated by a comparator device 203'' which receives analog signals from a recording reproduced from the program controller 70 and a feedback tachometer 76 driven by the shaft 73 of the controlled motor 72. The signals generated by controller 70 and tachometer 76 are bucked in the comparator device 203'' which may comprise a summing amplifier, resulting in an error or difference signal being generated at the output of 203'' which is indicative of the correction necessary in the control of motor 72 in order to make its operation conform to the command signal generated by the controller 70. The electric stroker forming part of the control sub-system 203 varies the operation of a hydraulic stroker therein in accordance with the signal received at the input to subsystem 203 while said hydraulic stroker is applied to vary the position of a slide block of a variable displacement hydraulic pump so as to vary the output of the pump and variably control the hydraulically operated motor 72 to cause the extrusion screw 74 to vary in accordance with the command control signals reproduced from the recording member of the program controller 70. Thus, the rate of flow of the extrusion E may be varied during the described operation of forming a portion of the wall thereof or even stopped during the forming operation in accordance with the signals generated on the outputs 71 of the multi-circuit controller 70.

Other devices of the types described in FIG. 8 which are automatically and sequentially controlled in a predetermined cycle by the program controller 70 include the means for operating the deforming tool or applying pressure to the mandrel or dies to deform the extrusion, rotating the mandrel and operating the cut-off means described. Notation 81 refers to a motor which is coupled to the mandrel 68 and, when operated by signals generated by controller 70, will rotate said mandrel at a predetermined speed for effecting the described tube beading, flaring, threading, machining or other deforming function. Although not illustrated, the described tooling mounted in the mandrel may also be operated to expand or project a deforming tool from the mandrel during one or more predetermined intervals in the extrusion cycle. In its place, in FIG. 9 is shown a first solenoid-operated valve 77 which controls the application of positive pressure from a source (not shown) applied to the inlet line 77' thereof and through a rotary coupling 78 connected to the shaft of mandrel rotating motor 81 and connecting the passageway in the mandrel with the output line of the solenoid valve 77. A second solenoid-operated valve 79 connects the source of negative pressure extending to the inlet 79' thereof with a flexible line 67 extending the passageways in the vacuum forming dies 61a and 61b. Suitable signals generated on the outputs of program controller 70 may thus be used to control the solenoids operating valves 77 and 79 to apply positive and negative pressure against selected portions of the wall of the extrusion to deform same into the cavities in the dies 61 after said dies have been advanced by their servos 64a and 64b in response to signals generated by the controller 70 into compressive engagement with the extrusion as described. Finally, signals generated on respective outputs of the controller 70 are utilized to energize the solenoids or servos 80a and 80b advancing cut-off knives or blades 65a and 65b against the extrusion E in alignment with the mandrel so as to effect the cutting off of lengths of said extrusion in timed relationship to the operations of deforming portions of the extrusion to produce sections of extruded tubing having deformed or beaded formations provided at predetermined portions of said sections.

Other variables which may also be controlled by means of the apparatus illustrated in FIG. 9 include pumps or solenoids for operating valves to admit coating or sealing material to predetermined portions of the tubular extrusion such as those portions at which cutoff will be effected or those portions containing the deformed channel or bead formations E' to permit sections of said tubing to be joined and sealed together after forming said sections. In place of operating the positive end or negative pressure admitting means shown in FIG. 9, the servos or solenoids 25 of FIG. 1, 39 of FIG. 3, 47 of FIG. 5, 47' of FIG. 5' and 66 of FIG. 7 may be predeterminately controlled by connection to one of the outputs of the program controller 70 and the provision of a suitable command control recording to be reproduced on said output in the proper sequence or interval during an extrusion cycle to provide the desired deformation or change in shape in the extrusion at predetermined locations thereof.

It is noted that the apparatus of FIG. 9, may also be operative to predeterminately provide sealing or adhesive material along selected portions of a tubular extrusion which comprise beaded formations or channels formed in or of the wall of the extrusion or along selected non-deformed portions of the extrusion to provide, for example, sealing or bonding means when lengths of the extrusion which are severed from the main extrusion are thereafter assembled together. The solenoid or pump means 77 may be operative in response to signals generated by the multi-circuit program controller 70 to inject sealant or adhesive material from a reservoir connected to the inlet line 77' through the passageways in the mandrel 68 so as to predeterminately coat selected lengths of the inside surface of the tube extrusion formed over said mandrel. Positive pressure may be terminated when it is desired to terminate the coating or filling operation or negative pressure may be applied by properly operating the device 77 to withdraw coating material from the passageways in the mandrel to prevent coating of other portions of the inside surface of the extrusion which are not desired to receive such sealing or adhesive material.

It is also noted that one or more passageways may extend through the mandrel from a source of coating or sealing material to one or more openings at the end of the mandrel from which the sealing material may be sprayed or flowed through the interior of the extrusion E to selected portions of the inside surface of the wall thereof. Such spray or flow coating may be effected by means of a nozzle disposed in the end of the mandrel communicating with the passageway therethrough for receiving and spraying or ejecting said coating material in a circular flow pattern when flow of said material is effected through the mandrel. While the mandrel 68 is illustrated as substantially constant in cross-section, the mandrel devices shown in FIGS. 1-6 and their associated situating servos may also be used in place of the mandrel 68 in an automatic apparatus operated as in FIG. 9 without departing from the spirit and scope of the invention.

The apparatus of FIGS. 1 to 8 may also be modified and operated by means of the control system of FIG. 9 to produce a circumferentially pleated tubular extrusion such as one having circular bellows-like formations extending along the length or predetermined portions of the length thereof. For example, the externally applied dies may be modified to contain a plurality of circular V-shaped grooves as cavities or the mandrel may contain projectable tooling as described which may be intermittently rotated as the extrusion is stopped and after advancing a short distance to provide similar bellowsglike formations therein. The rotation of suitable internal and/or external tooling such as described or modified forms thereof may also be operative to generate flexible tubing which is helically pleated or beaded to increase the tubing's flexibility and ability to bed without buckling.

In another form of the invention, it is noted that a selected portion or portions of an extrusion may be outwardly deformed as described by irregularly shaping the head of the mandrel or that portion of the mandrel which it is desired to effect deformation and selectively rotating the mandrel when a selected portion of an extrusion is aligned therewith to deform the extrusion. For example, if the mandrel is generatlly cylindrically shaped throughout its length with the exception of the end or head of the mandrel, which is provided with a protrusion or portion equivalent in shape, for example, to the shape of one of the described deforming tools when projected outwardly from the mandrel, then programmed or predetermined rotation of the mandrel may be utilized per se or in cooperation with a pair of dies of the type provided in FIG. 5 to deform that portion of the cylindrical extrusion to provide a bulge or beaded formation therein. Such extrusion would not be exactly cylindrical in shape as the irregular portion of the mandrel would normally form a channel or well in the wall of the extrusion extending parallel to the longitudinal axis of the extrusion. Rotation of such mandrel when the extrusion is stopped or stationery, would provide a circular channel in the wall of the extrusion or would flare the extrusion outwardly. Rotation of such mandrel while the extrusion is passing thereover would provide a spiral like channel or thread in the inside surface of the extrusion which could also cause a helical, thread-like formation in the exterior surface of the extrusion which may serve as a thread for joining sections of the extrusion together. The tooling means shown in FIG. 5' may also be operative to roll form or displace material of the extrusion wall to form a channel or helical thread like formation along selected portions of the extrusion wall per se or in cooperation externally applied dies or thread rolling means which is program controlled to engage the extrusion and cooperated with the mandrel and/or movable tooling supported thereby or forming a part thereof to internally and/or externally thread selected portions of the extrusion by causing the material thereof to deform of flow. Similarly, external machining or cutting means may also be brought to bear against the surface of the extrusion E in alignment with the portion of the mandrel which protrudes from the face of the die and may be predeterminately power operated,while the extrusion is held stationery or predeterminately driven from the die, in a manner to threads or channel like formations in the outer surface of the extrusion to permit the joining of sections of the extrusion after they are severed from the main extrusion and applied to a piping system or product.

The application of the hereinabove described and illustrated automatic tooling which is controlled to thread or otherwise shape selected portions of an extrusion as or immediately after it is formed combined with the program controlled selective severing of lengths of the extrusion having such threading or forming extending along predetermined portions of the severed lengths, will substantially reduce or eliminate the generally required post operation necessary to effect such threading or forming at the ends of lengths of pipe or tubing and, in many applications, will eliminate the need for securing special fittings to the tubing. The apparatus described for threading portions of and extrusion which will become the end portions of cut lengths thereof may also be modified as described to effect the automatic coating of the threaded formations or wall portions adjacent thereto with adhesive and/or sealing material operative to bond and/or seal together threadably secured end section of fittings thereto after the extrusion is properly cut to lengths along or adjacent to said threaded portions.

It is noted that the apparatus described may be modified in a number of additional ways to improve the operation thereof and provide new products. For example, the following variations are noted:

I. Tooling which is either a modified form of that illustrated in the drawings or is additionally supplied beyond the extrusion die, may be utilized to automatically sever predetermined portions of the deformed extrusion. For example, the tools 29 and 29' of FIG. 1 and 2 may be operative to form belled portions such as E' of the extrusion in cooperation with mandrel movement as described and to simultaneously sever lengths of the extrusion either through the belled portions E' of the wall of the tubing or immediately in front of or to the rear thereof.

Tooling, such as the type illustrated in FIGS. 3–6, may not be shaped not only to deform the extrusion by belling it as illustrated, but also to sever the belled portions of the tooling as rotated or sever the extrusion immediately in front or to the rear of the belled portions. For example, the provision of a sharp edge on the tool 37 of FIGS. 3 and 4, the tool 48 of FIG. 5 or the tool 48' of FIG. 5' may be utilized to spin-cut the extrusion so as to sever the length downstream thereof from the remainder of the extrusion as the mandrel is rotated. An auxiliary tool cooperating either upstream or downstream of the tools 37, 48 or 48' may also be utilized and operated in such a manner as to sever the extrusion while it is in motion or stationary, as described. The belling may also be effected while the extrusion is stationary as a result of stopping the extrusion procedure for a time sufficient to effect such operation.

II. If the tooling 37, 48 or 48' is projected outwardly against the extrusion while the mandrels 35 and 45 are controllably rotated and while the extrusions are moved in a predetermined speed through the die, a helical bead-like formation may be provided in the extrusion wall which may be utilized to change the physical characteristics of the extrusion. For example, if the bead-like formation is one in which the bead is heavy walled at its center and necked down where it joins the next spiral formation thereof, the tubing so formed may be flexed or bent without collapsing.

III. The tooling arrangement is illustrated in FIG. 5 and employs an elongated mandrel 45 with a power operated device 47' at the end thereof operative to project and retract a cutting tool, may be utilized to variably machine elongated tubes and rods by controlling the rotation of the mandrel simultaneously as the projectable tool is controlled. Such a tool may also be used to variably machine holes in work in addition to the inside surface of the wall of a tube, such as an extrusion or other shape.

IV. By controlling the longitudinal position of a mandrel such as mandrel 19 of FIG. 1 to vary the clearance between the wall of the die and the end portion of the wall of the mandrel, the wall thickness of the tubular extrusion may be predeterminately varied to add material, for example, immediately adjacent to or at the belled portion of the tubular extrusion to improve the physical characteristics of said portion. This operation may be effected concurrently with variations in the operation of the means feeding extrusion material to the die so as to increase the rate of flow of material when the annular die opening is increased and decrease said rate when the annular opening is decreased.

V. In addition to cutting or displacing material of the wall of an extrusion such as a tube or pipe to form or machine conventional threads on the inside surface of the extrusion as described, modified forms of the invention may be utilized to form or cut threads in the external surface of portions of an extrusion as it is moved from the extrusion die or while the extrusion is stopped as described so that when the extrusion is severed thereafter along or adjacent to the threads, either or both the severed portions will contain external threading for attaching couplings, valves and other fittings thereto of for securing lengths of said tubing together. In other words, both external tooling which is a modified form of that shown in FIGS. 1 or 9 and internal mandrel mounted tooling as provided in the other drawings, may be applied simultaneously or in sequence to different portions of an extrusion to providing lengths of tube, when severed from the extrusion, which are internally threaded at one end and externally threaded at the other end with the threads on the exterior of one tube section at one end thereof operative to screw assemble with the internal threads of one end of another lengths of said tubing.

The threading tooling may be operative to provide tapered pipe threads or constant diameter threads and additional means as defined in the drawings or modified forms thereof may be operative to apply sealant or elastomeric material to the threads so formed. as or immediately after they are formed. The external tooling described above may comprise aligned dies operative to be compressed against and thermally deformed the exterior surface of selected portions of the tubing with threads by operating on the softened plastic material before it has completely solidified and is yet in a condition to be "molded" to shape or by applying heat thereto to soften same as through said dies. Such threading tooling may also contain a rotating cutter or roll deforming tool operative to spin against the extrusion immediately after it leaves the extrusion die and is still aligned with the protruding mandrel so as to effect the deformation thereof.

VI. Modified forms of the external tooling defined in V.above may be operative to cooperate with the mandrel protruding from the end of the die in forming spiralling convolutions in the wall of the tubular extrusion or in otherwise forming the freshly formed tube as it extrudes to vary its shape along its length.

VII. The described means for applying a sealant such as an elastomer or other resilient polymer to selected portions of an extrusion may also be modified to coat selected portions of the inside and/or outside surface of an extrusion in accordance with particular requirements for selected lengths of the tubular extrusion. Such selective coating material may comprise a sealant such as an elastomer, adhesive, a polymer other than that forming the main extrusion, an abrasion resistant material or polymer applied to portions of the extrusion to be bent or otherwise formed and subject to greater erosive forces, a decorative material or other coating material.

VIII. Concurrently with the application of an elastomeric material or more flexible resin to a portion of the extrusion, the mandrel or external tooling may be operated to decrease or change the shape of the wall of the main extrusion which is adjacent to the applied sealant to provide a seat or recepticle for at least part of the resin.

IX. Utilizing modified forms of the invention provided herein, both flexible and rigid or lower durometer resins may be simultaneously or sequentially extruded to define variable portions of the cross sections of an extrusion or to provide an extrusion having entire portions of its length made of a rigid resin separated from portions of the length of said extrusion made of a flexible resin. Variations may include one resin being more rigid than the other to permit the tube to be easily flexed or bent along those portions thereof which are made of said more flexible resin. By program controlling the valving means for admitting each resin to the extrusion die ans/or the means for feeding said resins thereto, selected portions of the lnegth of an extrusion may be made more flexible than other portions in accordance with bending or installation requirements. Both flexible and rigid resins may also be varied in amounts along portions of a constant cross section extrusion or an extrusion which predeterminately varies with length and content of said multiple resins. Such resins as high and medium or low density polyethylene, polybutadiene styrene and impact polystyrene modified with rubber, rigid polyvinyl chloride and plasticized polyvinyl chloride, and others may be combined to provide such composite extrusions as proposed above.

X. The tooling illustrated in the drawings may be oscillated at frequencies of a cycle or more per second to provide ripples in the inside surface of a tubular extrusion for the purpose of improving the flow of fluid through the tubing.

I claim

1. An extrusion apparatus for forming tubing of variable cross-section comprising:
   an extrusion die,
   a mandrel supported within an extending through the opening in said die, said mandrel conforming to the inside surface of an extrusion formed in said die,
   means for guiding said mandrel for movement within said die,
   said die connected to an extrusion chamber for feeding material through said die and over said mandrel to form a tubular extrusion thereof,
   shape-changing means including tool means supported by said mandrel and moveable with respect to said mandrel for changing the shape of a tubular extrusion previously formed in said die, first power means for moving said tool means with respect to said mandrel, second power means for moving said mandrel within said die, and means for variably operating said shape changing means and moving said mandrel to cause selected portions of an extrusion passed through said die to be variably changed in shape along the length of the extrusion.

2. Extrusion apparatus in accordance with claim 1, wherein said shape-changing means is movably supported on said mandrel and is operable by said power means to move radially outwardly from said mandrel and engage the inside surface of the extrusion passing over the mandrel so as to change the shape thereof.

3. Extrusion apparatus in accordance with claim 2, wherein said shape-changing means is operable to outwardly deform the wall of the tubular extrusion to increase its outside diameter when said shape-changing means is power driven outwardly from said mandrel.

4. Apparatus in accordance with claim 2, wherein said shape-changing means includes tooling operative to engage and change the shape of the inside surface of the tubular extrusion passed through said die when operated by said power means.

5. An apparatus in accordance with claim 2, including means for power rotating said mandrel as said shape-changing means is moved outwardly therefrom so as to circumscribingly deform the tubular extrusion.

6. Apparatus in accordance with claim 5, wherein said shape-changing means is operative to outwardly bell the wall of the extrusion as it is rotated.

7. Apparatus in accordance with claim 5, wherein said shape-changing means is operative to machine the inside surface of said tubular extrusion and said shape-changing means is rotated with said mandrel.

8. Apparatus in accordance with claim 5, wherein said shape-changing means is operative to spirally bead the wall of said extrusion while the extrusion is driven over the rotating mandrel.

9. Apparatus in accordance with claim 1, said extrusion shape-changing means being operative when actuated to thread the wall of the extrusion and means for activating and de-activating said shape-changing means during predetermined times in an extrusion cycle so as to thread selected portions of the extrusion to the exclusion of the other portions thereof.

10. Apparatus in accordance with claim 1, wherein said shape-changing means comprises first tooling associated with said mandrel and second tooling supported beyond the end of said die, and means for operating said first and second toolings to cooperate with each other in deforming selected portions of the extrusions formed in the die.

* * * * *